United States Patent
Kawaguchi et al.

(10) Patent No.: US 6,356,304 B1
(45) Date of Patent: *Mar. 12, 2002

(54) METHOD FOR PROCESSING VIDEO SIGNAL AND APPARATUS FOR PROCESSING VIDEO SIGNAL

(75) Inventors: Naoki Kawaguchi; Shuji Shimizu; Makibi Nakamura, all of Kanagawa (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/847,747

(22) Filed: Apr. 22, 1997

(30) Foreign Application Priority Data

Apr. 29, 1996 (JP) ................................................ 8-129328

(51) Int. Cl.[7] ...................... H04N 5/228; H04N 5/238; H04N 5/21; G06K 9/40
(52) U.S. Cl. ...................... 348/222; 348/363; 348/626; 382/266
(58) Field of Search .................. 348/234, 235, 348/606, 607, 618, 625, 362, 363, 222; 382/266

(56) References Cited

U.S. PATENT DOCUMENTS

| | | | | |
|---|---|---|---|---|
| 3,554,103 A | * | 1/1971 | Harvey | 396/258 |
| 4,473,845 A | * | 9/1984 | Davy | 348/616 |
| 4,733,296 A | * | 3/1988 | Honbo et al. | 348/263 |
| 5,157,481 A | * | 10/1992 | Kashimura et al. | 348/263 |
| 5,249,012 A | * | 9/1993 | Taniguchi et al. | 396/81 |
| 5,258,845 A | | 11/1993 | Kyuma et al. | 358/213.19 |
| 5,293,542 A | * | 3/1994 | Ise et al. | 348/228 |
| 5,696,850 A | * | 12/1997 | Parulski et al. | 382/261 |
| 5,748,800 A | * | 5/1998 | Ueta et al. | 382/266 |
| 5,764,292 A | * | 6/1998 | Yamaguchi | 348/363 |

FOREIGN PATENT DOCUMENTS

| | | | | |
|---|---|---|---|---|
| EP | 0 528 433 A2 | | 2/1993 | H04N/5/235 |
| EP | 0 560 288 A2 | | 9/1993 | H04N/5/235 |
| EP | 566383 | * | 10/1993 | G03B/9/06 |
| JP | 57-190463 | * | 11/1982 | H04N/5/14 |
| JP | 63-136776 | * | 6/1988 | H04N/5/232 |
| JP | 4-358479 | * | 12/1992 | H04N/5/217 |
| JP | 5-347730 | * | 12/1993 | H04N/5/243 |
| JP | 6-292054 | * | 10/1994 | H04N/5/228 |

OTHER PUBLICATIONS

PTO 99–4067, Translation of Kitamura et al., Television Camera, Nov. 1982.*
PTO 99–4022, Translation of Kobayashi (JP6–292054).*

(List continued on next page.)

Primary Examiner—Andrew B. Christensen
(74) Attorney, Agent, or Firm—Frommer Lawrence & Haug LLP; William S. Frommer; Glenn F. Savit (57) ABSTRACT

An image which is seen as a natural feeling can be attained in such a manner that a resolution of a photographed image is kept substantially constant irrespective of any variation in condition of an optical system such as an iris diaphragm diameter and a zoom position. For example, in the case that it is adapted for an iris diaphragm diameter, an MTF corresponding to a variation of an iris diaphragm diameter is measured (FIG. 6A) and then a gain of an output of an aperture control circuit capable of canceling a reduction of high frequency component of the image signal corresponding to the measured MTF (FIG. 6B). Then, an iris diaphragm diameter varied during a photographing operation is detected, a gain set in response to the detected iris diaphragm diameter is applied to the aperture control circuit, thereby a control is carried out such that an amplitude of the high frequency component of the brightness signal (FIG. 6C) being kept substantially constant without having any relation with the iris diaphragm.

20 Claims, 9 Drawing Sheets

OTHER PUBLICATIONS

Rebiai et al., "Image Distortion from Zoom Lenses: Modeling and Digital Correction"; IEEE, International Broadcasting Convention; pp. 438–441, Jul. 1992.*

Patent Abstracts of Japan, vol. 96, No. 3, 1996, JP 7–298275 A (Sanyo Electric Co. Ltr.), Mar. 29, 1996.

Patent Abstracts of Japan, vol. 18, No. 195(E–1533), 1994, Jp 5–347730 A (Fuji Photo Film Co. Ltd.), Apr. 5, 1994.

Patent Abstracts of Japan, vol. 96, No. 2, 1996, JP 7–264442 A (Matsushita Electric Ind. Co. Ltd.), Feb. 29, 1996.

Murata N et al.: "Digitale 1–Chip–LSI–Fernsehkamera" Fernseh Und Kinotechnik, vol. 48, No. 1/02, Jan. 1, 1994, pp. 11–17, XP000429815.

* cited by examiner

IRIS DIAPHRAGM
STATE 1

FIG. 5B

IRIS DIAPHRAGM
STATE 2

FIG. 5C

IRIS DIAPHRAGM
STATE 3

FIG. 5D

IRIS DIAPHRAGM
STATE 4

FIG. 5E

IRIS DIAPHRAGM
STATE 5

F I G. 6A

F I G. 6B

F I G. 6C

APERTURE CONTROL CORRESPONDING TO
IRIS DIAPHRAGM DIAMETER

APERTURE CONTROL CORRESPONDING TO ZOOM POSITION

FIG. 8A

| FIG. 8B | FIG. 8C |
|---|---|
| P1 (SUBJECT) | Pa1 (SUBJECT IMAGE) |
|  |  |

| FIG. 8D | FIG. 8E |
|---|---|
| P2 (SUBJECT) | Pa2 (SUBJECT IMAGE) |
|  |  |

| FIG. 8F | FIG. 8G |
|---|---|
| P3 (SUBJECT) | Pa3 (SUBJECT IMAGE) |
|  |  |

METHOD FOR PROCESSING VIDEO SIGNAL AND APPARATUS FOR PROCESSING VIDEO SIGNAL

BACKGROUND OF THE INVENTION

1. Field of the Invention

This invention relates to a method for processing a signal and an apparatus for processing a signal, and more particularly this invention is preferably applied to a signal processing method and a signal processing apparatus in which a video signal taken by a photographing device provided with an optical system such as a video-camera or a still-camera or the like is processed.

2. Description of the Related Art

It has become well known to provide, as a photographing device, a so-called digital video camera (photographing a motion picture) or a digital still-camera (photographing a still picture) or the like, for example.

In such a photographing device as described above, its operation is carried out such that an image photographed through an optical system is taken into the device, although it has been known that a degree of resolution of the photographed image is deteriorated more than that of a subject due to an aberration of a lens installed in the optical system.

In view of this fact, it has already been provided to correct a degree of resolution of the image through an aperture control for an image signal of the photographed image. The aperture control used herein is defined as a signal processing in which a correction is carried out for improving a degree of apparent resolution while a high regional component of a brightness signal of a photographed image signal, for example, is intensified with the result that an edge part of the photographed image (in this case, this is defined as an interface part of a brightness in the image) is made apparent.

It has already been known in the art that a degree of deterioration in resolution of the photographed image is also changed in response to a condition of the image during a photographing operation and the resolution of the image is made remarkably different by changing a degree of opening of the aperture, for example.

However, in the case of the usual aperture control performed up to now, it has been carried out that a predetermined gain which has been uniformly set is applied to an image signal of the photographed image so as to amplify an amplitude of the high level component. Due to this fact, devices have not been provided which perform a correction in compliance with a variation of a resolution caused by a variation of a degree of opening of the iris diaphragm as described above or a variation in state of a zoom position of a zoom lens.

Due to this fact, there was a problem that "irregular patterns" were generated in the resolution of the photographed image to cause a normal image not to be attained at a glance because of a variation in state of an iris diaphragm or a zoom position during photographing operation irrespective of the fact that a photographing was carried out by the same photographing device.

SUMMARY OF THE INVENTION

In view of the foregoing, the present invention performs a correction for variation of a resolution of image signal generated in response to a variation in state of an optical system in the photographing device to cause its value to become approximately constant by an image signal processing method for processing an image signal for a photographed image in order to solve the aforesaid problems.

In addition, the image signal processing device for processing an image signal for photographed image is provided with a resolution correcting means for correcting a variation of resolution of the aforesaid image signal generated in response to a variation in state of an optical system of the photographing device in such a way that its value may become substantially constant.

DESCRIPTION OF THE PREFERRED EMBODIMENT

Referring now to FIGS. 1 to 9, one preferred embodiment of the present invention will be described as follows. As the preferred embodiment of the present invention, it is assumed that the present invention is applied to a video camera device.

Subsequent description will be made in the following order.
1. Modulation Transfer Function (MTF)
2. Configuration of a video camera device:
3. Configuration and basic operation of an aperture control circuit.
4. Iris diaphragm mechanism of the preferred embodiment.
5. Correction of resolution of the preferred embodiment. Correction corresponding to a variation of iris diaphragm diameter.
6. Correction of resolution of the preferred embodiment, and Correction corresponding to a variation of zoom position.

1. Modulation Transfer Function (MTF)

For example, a characteristic of resolution of a lens applied in an optical system of the photographing device can be expressed by an MTF. A reading accuracy of a sinusoidal wave attained through an optical system such as a lens is called an optical transfer function (OTF) and this OTF can be expressed by a complex number. An absolute value of this OTF is called as an MTF to express a transfer function of amplitude.

Then, at first, referring to FIGS. 8 and 9, a technical concept of the MTF corresponding to the optical system of the video camera in the preferred embodiment of the present invention will be described as follows.

Figure 8A:
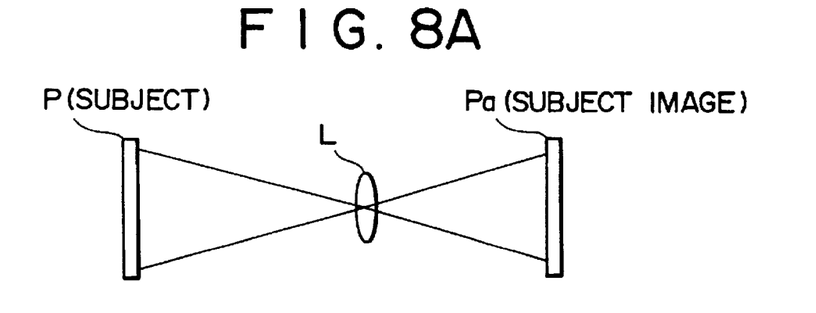
FIG. 8 is an illustrative view for illustrating a deterioration of resolution corresponding to a space frequency caused by an aberration of a lens.

FIG. 8A shows, in a schematic manner, a relation between a subject P and a subject image Pa obtained through a lens L in respect to the subject P.

Figure 8B:
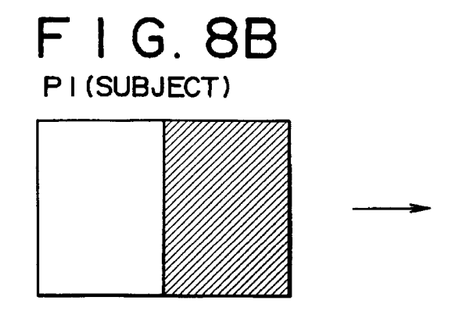
Figure 8C:
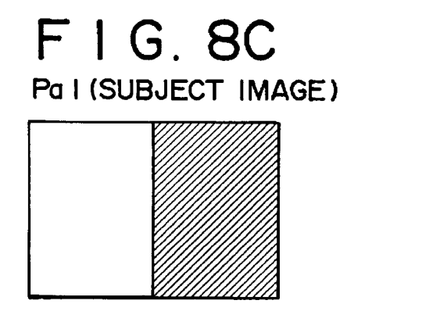

For example, as shown in FIG. 8B, it is assumed that a subject P is set such that a white section and a black section are substantially divided into a half-segment in a lateral direction, respectively. In the case that the subject P in FIG. 8B is viewed in reference to its space frequency, it is possible to see that it has a quite low space frequency in a horizontal direction. Then, as per the subject image Pa1 obtained through the lens L shown in FIG. 8B, a scarce influence of aberration of the lens L is applied due to a sufficient low space frequency of the subject P in a lateral direction, resulting in that an accurate resolution which is approximately similar to that of the subject P can be attained as shown in FIG. 8C.

Figure 8D:
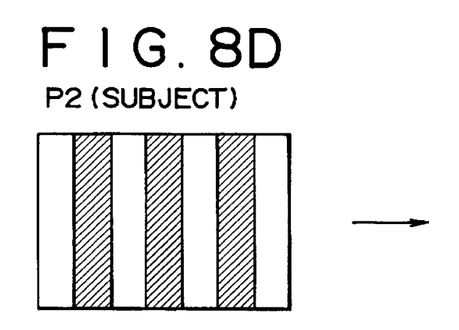
Figure 8E:
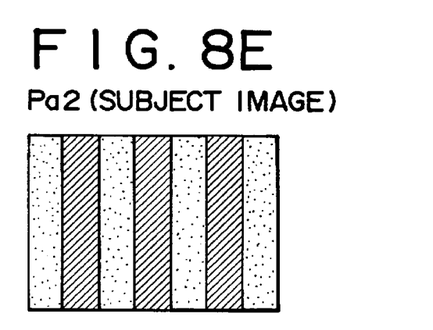

Although FIG. 8D illustrates a frequency having a higher space frequency in a lateral direction than that shown in FIG. 8B, influence of aberration of the lens may start to appear in the subject image Pa2 obtained through the lens for such subject P2 as above. That is, as shown in FIG. 8E, the subject image may become one in which the component of black section is merged into the white section so as to reduce its brightness and in turn the component of white section is merged into the black section so as to increase its brightness. In other words, in view of an image, the image of the white section and the image of the black section are not completely separated from each other to reduce their difference in brightness, resulting in that an entire image may present an impression of a vague image. That is, the resolution may be reduced.

Figure 8F:
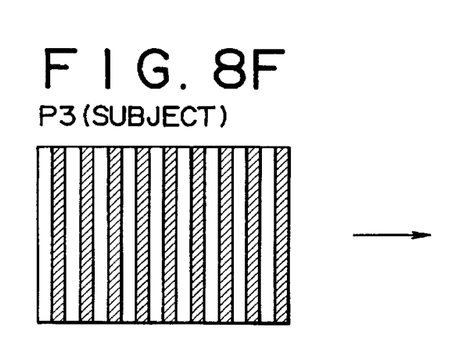
Figure 8G:
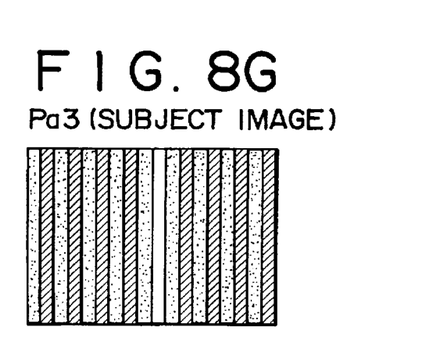

Although in FIG. 8F there is illustrated a subject P3 having a higher space frequency in a lateral direction than that shown in FIG. 8D, the subject image Pa3 shown in FIG. 8G obtained in correspondence with the subject P may be influenced more by aberration than the subject P2 and the subject image Pa2 shown in the aforesaid FIGS. 8D and 8E, and actually a difference in brightness between the white image section and the black image section is reduced, resulting in that the impression of more vague image is attained.

Figure 9A:
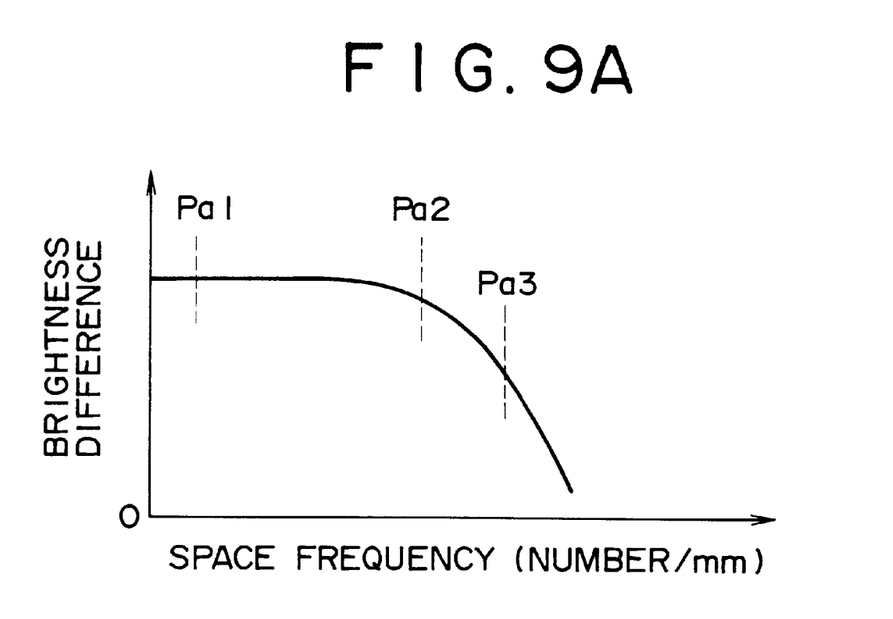
FIG. 9 is an illustrative view for illustrating a technical concept of an MTF in response to a difference in brightness.

A relation of the difference in brightness of the subject image Pa in respect to a space frequency of the subject P illustrated in reference to the aforesaid FIG. 8 can be expressed as indicated in FIG. 9A, for example. Also in this figure, influence of aberration is scarcely applied at the space frequency corresponding to the subject image Pa1 so as to enable a superior brightness difference to be attained, although it is apparent that the brightness difference is reduced at the space frequency corresponding to the subject image Pa2. This brightness difference is further reduced at the space frequency corresponding to the subject image Pa3.

Figure 9B:
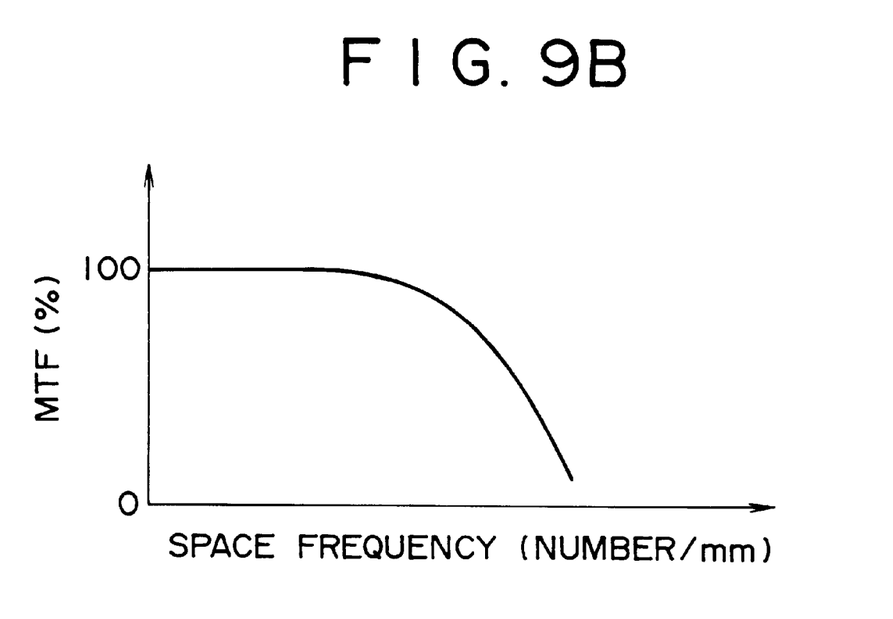

Then, in this case, it is possible to assume that a value indicated at the ordinate is an MTF when a brightness difference at 0 of the space frequency indicated at the abscissa in the aforesaid FIG. 9A is 100%. Accordingly, a relation of the MTF of the subject image Pa in respect to the space frequency of the subject P is indicated as shown in FIG. 9B.

In this case, if the lens is "an ideal lens" having no aberration, this MTF always becomes 100% irrespective any value of the space frequency.

2. Configuration of a Video Camera Device

Figure 1:
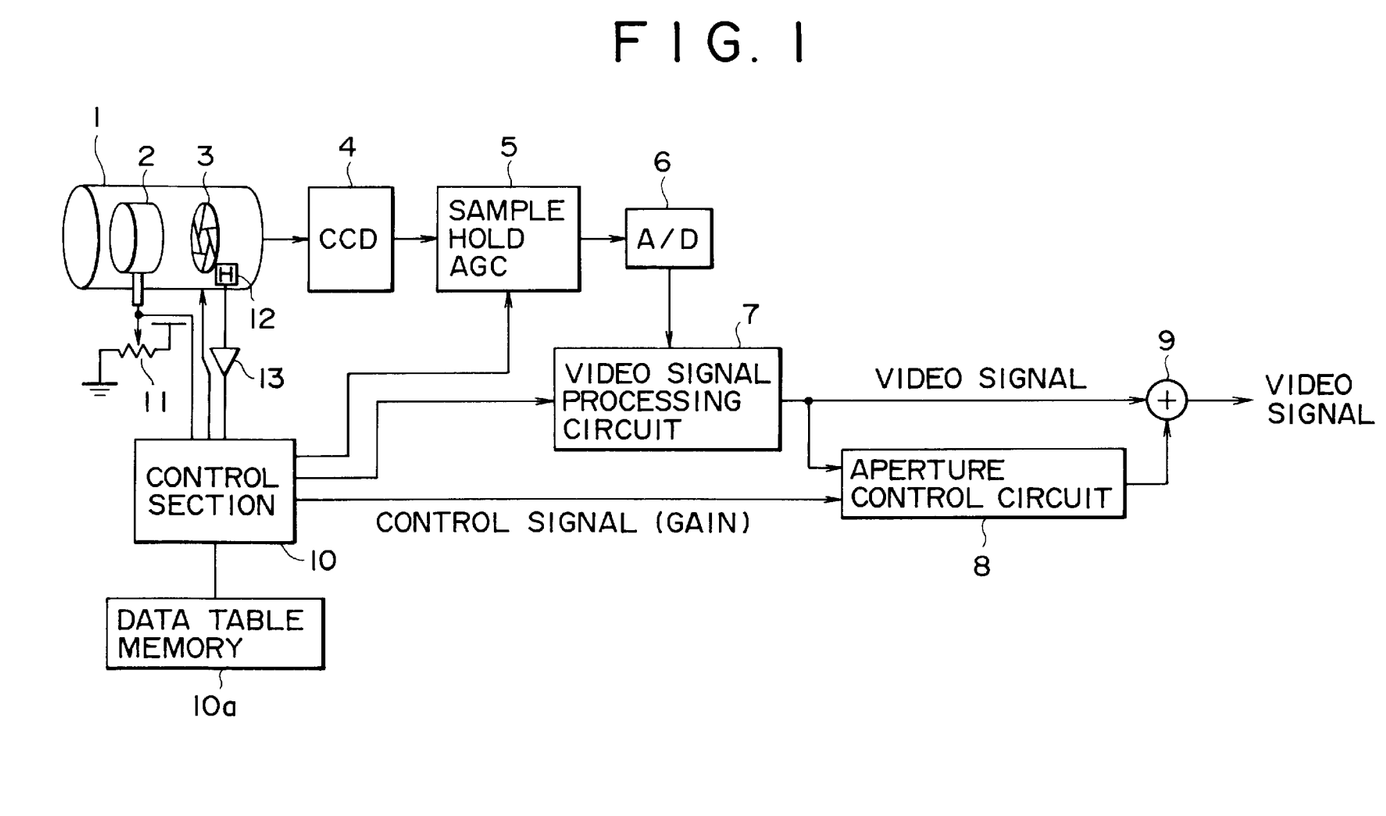
FIG. 1 is a block diagram for showing a configuration of a substantial part of a video camera of a preferred embodiment of the present invention.

FIG. 1 is a block diagram for schematically showing a configuration of a substantial section of a video camera of the preferred embodiment of the present invention. In this figure, only an optical system and a signal processing system for performing an opto-electrical conversion of an image photographed by this optical system and for processing a signal are indicated.

In this figure, a lens block 1 is an optical system of a video camera of the preferred embodiment of the present invention. This lens block 1 is provided with a zoom lens 2 capable of performing a zooming for a subject image while its zoom position is made variable within a predetermined range. An amount of light passed through the zoom lens 2 is adjusted by an iris diaphragm 3 so as to adjust an image brightness or a depth of the subject. In addition, as the iris diaphragm 3 shown in this figure, a mechanism in which many vanes are coupled to each other in a symbolic manner to adjust a degree of aperture in a substantial coaxial manner, although in the preferred embodiment, an iris diaphragm mechanism having two vanes coupled to each other to be described later is employed.

The aforesaid zoom lens 2 is provided with a potentiometer 11 as shown in the figure. At the zoom lens 2, a lens called as a variater is moved in correspondence with a focal distance which is made variable for a zooming operation within a predetermined range along an optical axis, for example. Information about this moving position (a zoom position) is detected by the aforesaid potentiometer 11 and this signal is supplied to a control section 10 as information on zoom position.

In addition, although a hole element 12 is arranged in respect to the iris diaphragm 3, an iris diaphragm diameter (a degree of opening) of the iris diaphragm 3 is detected by the hole element 12, wherein this detected signal is supplied to the control section 10 as an iris diaphragm information through an amplifier 13.

These information on zoom position and information on iris diaphragm diameter are applied for an AE (Automatic Exposure) control or an AF (Automatic Focusing) control performed at the control section 10, for example. In the preferred embodiment, a control signal is supplied to the aperture control circuit 8 as described later in response to the aforesaid information on zoom position and information on iris diaphragm diameter, thereby an aperture control for the image signal is carried out.

In this case, as a photographing element, a CCD (Charge Coupled Device) 4 is used. A photographing signal based on a charge read out of this CCD 4 is supplied to a sample hold/AGC (Automatic Gain Control) circuit 5, amplified with a predetermined gain and sample held, thereafter the signal is supplied to an A/D converter 6. The A/D converter 6 converts the photographing signal with the supplied analog signal into a digital signal and then supplies it to the video signal processing circuit 7.

At the video signal processing circuit 7, the image signal converted into the digital signal is processed with a predetermined signal processing so as to output it as a video signal with a digital signal through a synthesizer 9. This video signal output is supplied to or stored in an external image signal recording device or a stored image signal recording device or the like not shown, for example, or supplied to a monitor device or a liquid crystal display device or the like for use in displaying the photographed image. An output from the video signal processing circuit 7 is also branched and supplied to the aperture control circuit 8.

The aperture control circuit 8 amplifies the inputted image signal at its high range component to generate an intensified signal component. An output of this aperture control circuit 8 is supplied to the synthesizer 9. Although a high range component of the image signal properly amplified is overlapped on an original image signal at the synthesizer 9, an edge part of the displayed image is intensified as described later and then an apparent resolution of the image is improved. In addition, in this figure, although the image signal outputted from the video signal processing circuit 7 is inputted to the aperture control circuit 8, it is sufficient for the processing of the aperture control with the actual aperture control circuit 8 to be carried out only for a brightness signal component which is highly influenced by a high range frequency.

In a data table memory 10a is stored a data table required for variably setting a gain of an output signal from the aperture control circuit 8 in response to a variation in state of the lens block 1 to be described later and this operation will be described later.

3. Configuration and Basic Operation of an Aperture Control Circuit

Figure 2:
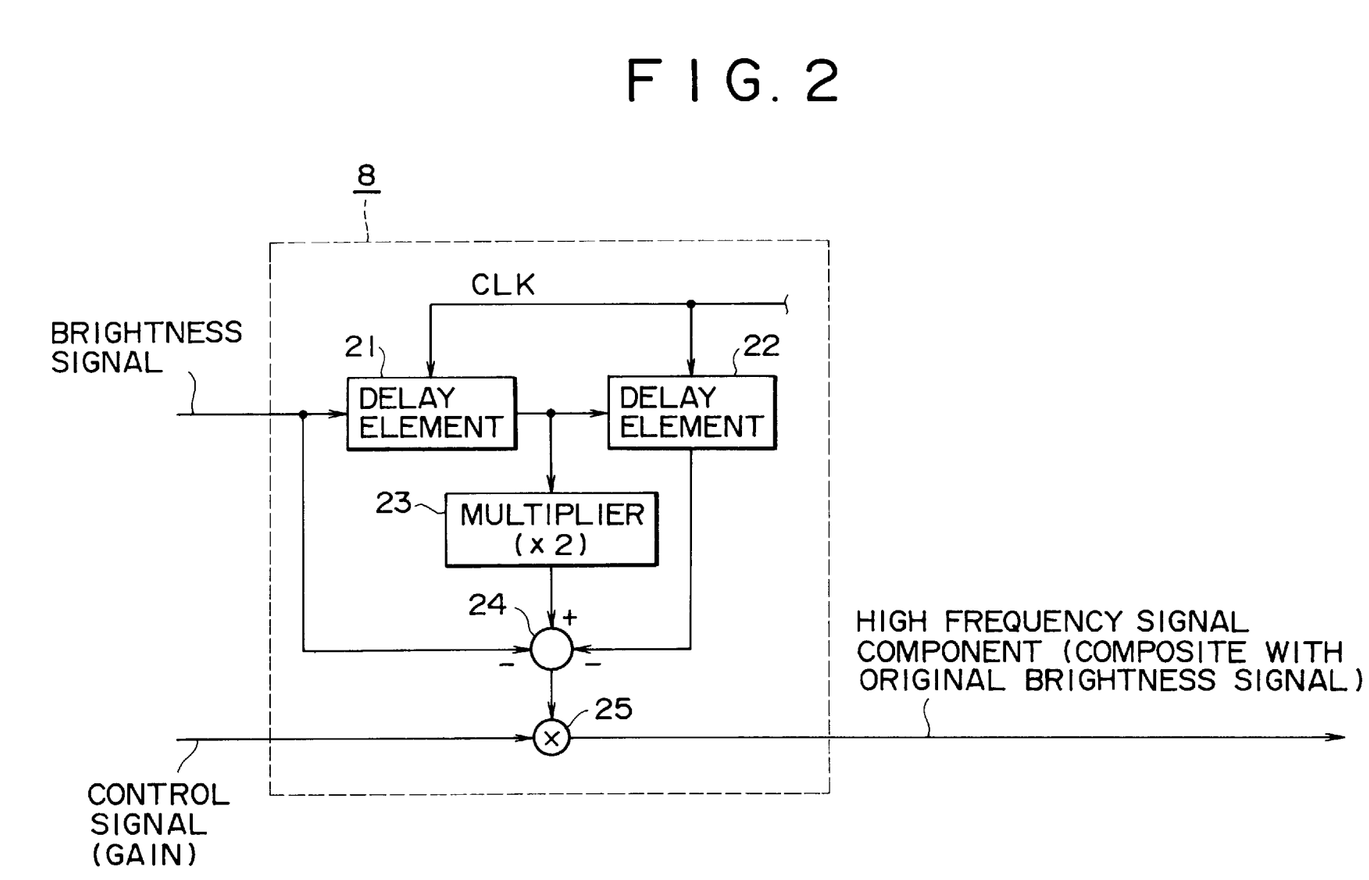
FIG. 2 is a block diagram for showing an example of configuration of an aperture control circuit of the preferred embodiment of the present invention.

FIG. 2 is a block diagram for showing schematically an illustrative configuration of the aforesaid aperture control circuit 8.

As the aperture control circuit 8 of the preferred embodiment, although each of aperture control circuits for correcting resolutions in both horizontal direction and vertical direction of an image is provided, respectively, a configuration of the circuit for correcting the resolution in the horizontal direction of the image is illustrated in this case.

The aperture control circuit 8 shown in this figure is comprised of delay elements 21, 22, a multiplier 23, a synthesizer 24 and a multiplier 25. In this case, a delay time corresponding to a clock frequency of a clock signal CLK is set in the delay elements 21, 22. However, if a resolution of the image in a horizontal direction in this case is to be corrected, a clock frequency corresponding to the number of pixels contained in 1H is set. To the contrary, if the frequency of 1H for the clock signal CLK is set, it is possible to obtain an aperture control circuit for correcting a resolution in a vertical direction by the circuit configuration which is similar to that shown in FIG. 2.

A brightness signal component of the image signal with the digital signal outputted from the video signal processing circuit 7 is inputted to the delay element 21 and the synthesizer 24. A delay output of the delay element 21 is inputted to the delay element 22 and at the same time, it is inputted to the multiplier 23 for performing a multiplication by two times for the input signal.

At the synthesizer 24, an original signal component to be inputted from the video signal processing circuit 7 and a brightness signal component which is a delay output from the delay element 22 are subtracted from a signal component passed from the delay element 21 through the multiplier 23.

An output of the synthesizer 24 is expressed as (−1+2D−D2) in respect to the brightness signal component with an original image signal being set as 1 and a signal delayed by 1 clock against the original image signal being defined as D. That is, the aforesaid delay elements 21, 22, the multiplier 23 and the synthesizer 24 may form a high-pass filter and take a desired high range component from the original brightness signal.

At the multiplier 25, a gain control signal acting as a control signal supplied from the control section 10 is applied to the high range component of the brightness signal which is an output from the aforesaid synthesizer 24. That is, a coefficient of the gain which is variably set as described later is multiplied against the high range component of brightness signal, resulting in the high range component of the brightness signal being intensified.

Then, the high range component of the original image signal is intensified by superposing the high frequency component provided with the gain outputted from the multiplier 25 in respect to the brightness signal of the original image signal (synthesized by the synthesizer 9).

FIG. 3 is an illustrative view for showing a variation of an image state obtained by a basic operation in the aforesaid aperture control circuit 8.

Figure 3A:
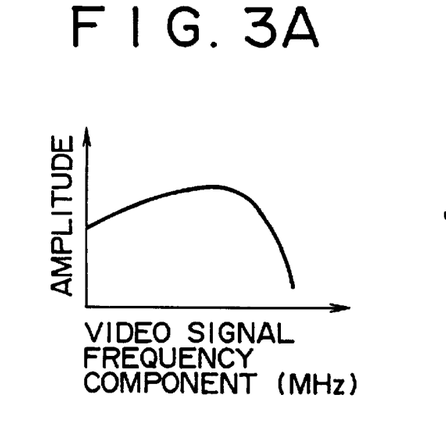
FIG. 3 is an illustrative view for illustrating a basic operation of an aperture control circuit.
Figure 3B:
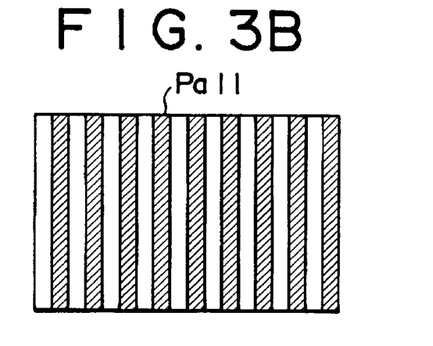

For example, it is assumed that the subject image Pa11 corresponding to the image signal frequency component shown in FIG. 3A is one shown in FIG. 3B. Then, the subject image Pa12 having a characteristic in which an MTF is more deteriorated than that shown in FIG. 3A and corresponding to that of FIG. 3C becomes one shown in FIG. 3D with a result that a resolution of the image is reduced.

Figure 3C:
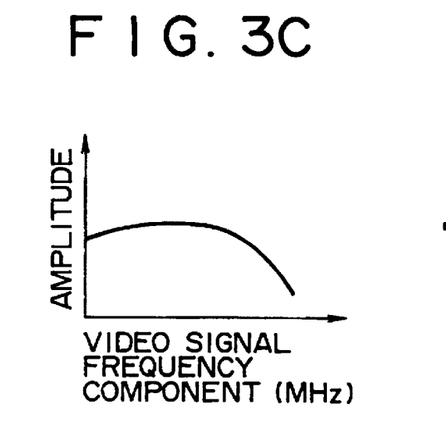
Figure 3D:
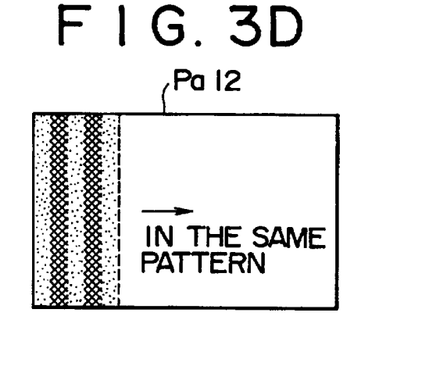
Figure 3E:
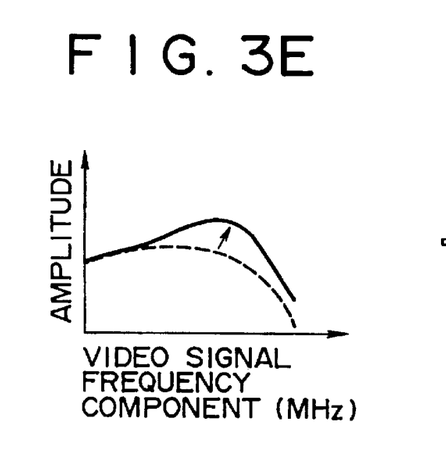
Figure 3F:
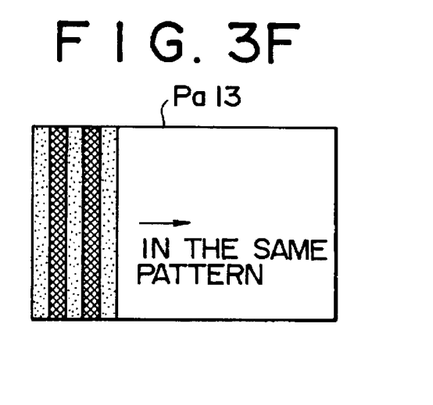

In view of this fact, as for the image signal having a characteristic indicated in the aforesaid FIG. 3C, it is assumed that its high range component is intensified by the aperture control performed by the aperture control circuit 8 illustrated in FIG. 2, an amplitude of the high range component is lifted up as shown in FIG. 3E, for example, and then a signal processing is carried out to enable the approximate same characteristic as that shown in FIG. 3A to be attained. With such an arrangement as above, an edge part of the image (in this case, an interface between the white segment and the black segment) is intensified as shown in the subject image Pa13 in FIG. 3F and then an apparent resolution of the image is improved.

4. Iris Diaphragm Mechanism of the Preferred Embodiment

As described above, the MTF value may be varied in response to a variation of an iris diaphragm diameter in the optical system of the photographing device of a video camera or the like. In other words, it is already been established that an irregular resolution state occurs in a resolution perception of the subject image due to a variation in the iris diaphragm diameter. In the preferred embodiment of the present invention, it is constructed such that utilization of the aperture control circuit 8 described in reference to FIGS. 2 and 3 causes an aperture control to be carried out in such a way that a resolution perception of the subject may become constant in respect to a variation of iris diaphragm diameter. Referring now to FIG. 4, the mechanism of two-vane type iris diaphragm employed in a video camera of the preferred embodiment will be described.

Figure 4A:
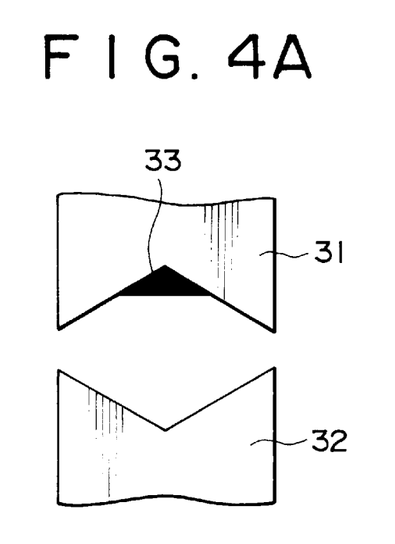
FIG. 4 is an illustrative view for showing an iris diaphragm mechanism in the preferred embodiment.
Figure 4B:
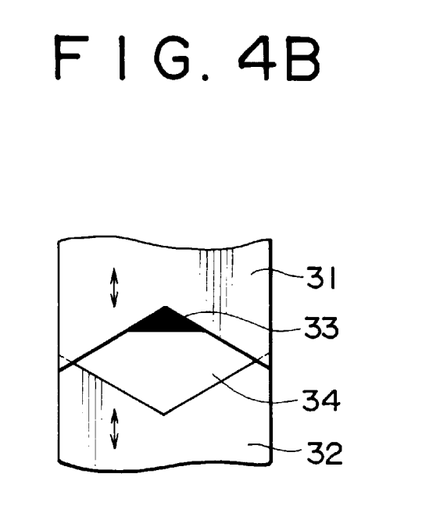

The iris diaphragm 3 is comprised of a combination of two vanes 31, 32 having ends with a shape such as that shown in FIG. 4A. In this case, at the position shown in the figure of the vane 31 side is fixed an ND filter (ND: Neutral Density Filter) 33. As is well known in the art, the ND filter 33 is an optical filter for use in attenuating an amount of incident light of the visible light band, wherein it enables an incident amount of visible light to be attenuated without applying any influence on a color balance. As shown in FIG. 4B, the aforesaid vanes 31, 32 are coupled to each other in a direction indicated by the arrow and an area of the opening 34, i.e. an iris diaphragm diameter is adjusted. In the case that the iris diaphragm having such two-vane mechanism as above is employed, it is possible to construct the optical system at a lower cost than that required for the case in which the iris diaphragm of the mechanism forming a substantial concentric opening with many vanes is applied.

5. Correction of Resolution of the Preferred Embodiment

Correction Corresponding to a Variation of Iris Diaphragm Diameter

A correction of resolution in respect to a variation in an iris diaphragm diameter in the preferred embodiment will be described as follows.

Although a variation of resolution in respect to a variation of an iris diaphragm diameter of the photographing device, i.e. a variation of an MTF is made different for every type of equipment in accordance with the configuration of the optical system used in the photographing device, it is possible to attain the variation in advance by performing its measurement. In view of this fact, in the preferred embodiment of the present invention, it becomes possible to perform a correction of resolution by controlling the gain in the aperture control circuit 8 to be described later in response to a result of such measurement as mentioned above. With reference to FIG. 5, a variation of the MTF corresponding to the iris diaphragm diameter of the iris diaphragm 3 of the preferred embodiment shown in FIG. 4 will be described. In addition, in FIG. 5, a part of the opening 34 of the iris diaphragm 3 is indicated and illustration of its surrounding part is eliminated. Also in this case, for example, a chart of the subject shown in FIG. 3B is applied, resulting in that the MTF in a horizontal direction is assumed to be measured.

Figure 5A:
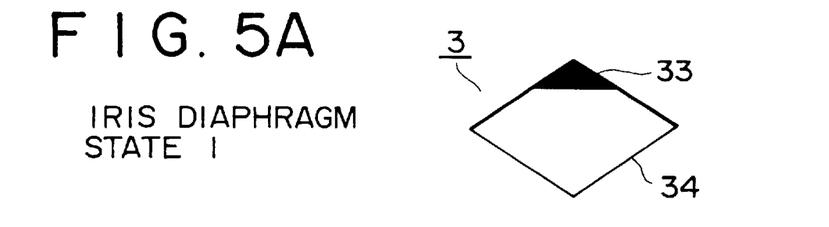
FIG. 5 is an illustrative view for showing a variation of an iris diaphragm diameter in the preferred embodiment.

In FIG. 5A there is illustrated a state in which the iris diaphragm 3 is released as "the iris diaphragm state 1". Then, it is assumed that the iris diaphragm 3 is narrowed from this state and subsequently the opening 34 is narrowed up to such a degree as one indicated as "the iris diaphragm state 2" shown in FIG. 5B.

As the iris diaphragm is being narrowed in general, influence of aberration of a lens is reduced, whereby the MTF value is usually and correspondingly increased. Due to this fact, under the case of "iris diaphragm state 2" in FIG. 5B, a higher value of MTF as compared with that of "iris diaphragm state 1" in FIG. 5A can be attained.

Figure 5B:
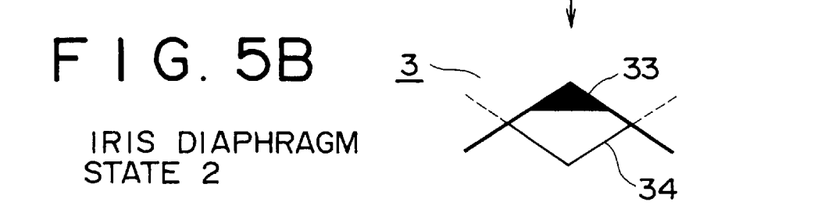
Figure 5C:
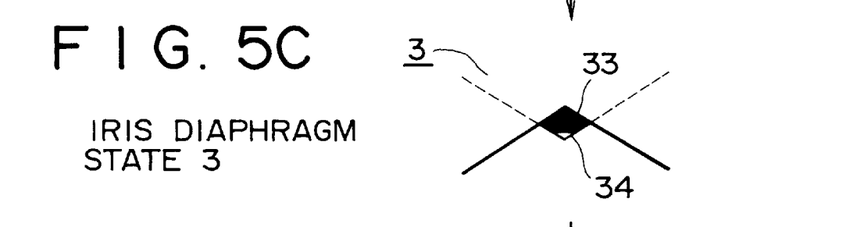

Then, it is assumed that an iris diaphragm is further reduced from the state shown in FIG. 5B with a result that the "iris diaphragm state 3" shown in FIG. 5C is attained. This "iris diaphragm state 3" shows that an area occupied by the ND filter 33 at the opening 34, for example, becomes almost the entire opening area and in turn a space not influenced by an effect of the ND filter 33 becomes quite low.

Under such a state of the iris diaphragm as described above, a value of MTF should be high enough due to a quite reduced influence of aberration of a lens in general, although actually a space not influenced by the ND filter 33 becomes quite narrow and then a diffraction of light may occur at this space part to reduce the value of MTF.

In other words, in the case that an iris diaphragm is narrowed gradually as a transient state from FIG. 5B to FIG. 5C, an area of the space where no effect of the ND filter 33 is applied to the opening 34 is decreased, with the result that a diffraction phenomenon of light described above cannot be ignored and in opposition to it, a characteristic in which a value of MTF is gradually deteriorated can be attained.

Figure 5D:
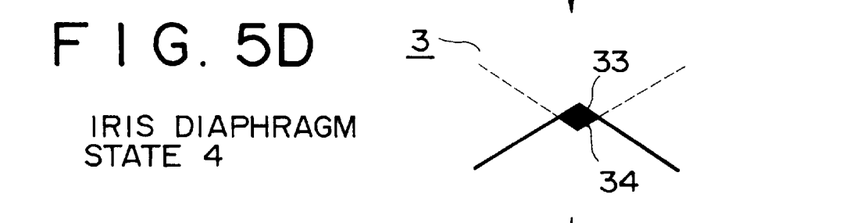

Then, the iris diaphragm is further narrowed from the state shown in FIG. 5C and under such a state as shown in "the iris diaphragm state 4" in FIG. 5D in which the opening 34 is occupied by the ND filter 33 and the effect of the ND filter 33 is completely applied, the diffraction of light is decreased and the value of MTF is increased again.

Figure 5E:
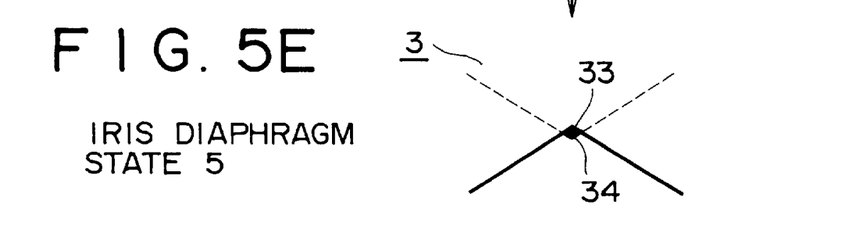

In addition, in the case that the iris diaphragm is further narrowed from the state shown in FIG. 5D to become the state indicated by the iris diaphragm state 5 in FIG. 5E, an area of the opening 34 becomes quite narrow, resulting in that an influence of diffraction of light is increased again and the value of MTF is decreased.

Figure 6A:
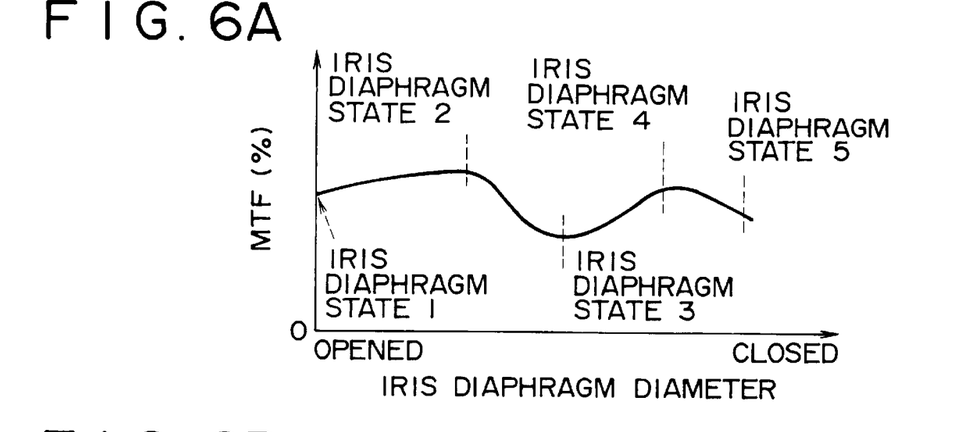
FIG. 6 is an illustrative view for showing an aperture control method in response to an iris diaphragm diameter in the preferred embodiment.

In the preferred embodiment of the present invention, there has been attained a result of measurement shown in FIG. 6A as a relation of a variation of MTF corresponding to a variation of the iris diaphragm diameter (an area of the opening 34) described up to now in reference to FIG. 5. In this figure, an iris diaphragm diameter is indicated at an abscissa and a value of MTF corresponding to an iris diaphragm diameter is indicated at an ordinate.

In addition, in this FIG. 6A, each of the sample positions of "iris diaphragm states 1 to 5" indicated in FIGS. 5A to 5E is expressed on a curve line indicating a characteristic of MTF, although the value of MTF is gradually increased in compliance with a variation of the iris diaphragm diameter from "the iris diaphragm state 1" to "the iris diaphragm state 2" as described above in reference to FIG. 5, and in turn, as for a variation of the iris diaphragm diameter from "the iris diaphragm state 2" to "the iris diaphragm state 3", it is changed in such a way that the value of MTF is decreased and further as for a variation of the iris diaphragm diameter from "the iris diaphragm state 3" to "the iris diaphragm state 4", it is changed in such a way that the value of MTF is increased again. Then, as for the variation of the iris diaphragm diameter from "the iris diaphragm state 4" to "the iris diaphragm state 5", the value of MTF is decreased.

In view of the foregoing, the preferred embodiment of the present invention is constituted to perform a correction in such a way that a resolution of the subject image may be kept constant irrespective of a variation of MTF caused by the iris diaphragm diameter by making a variable gain (a control signal supplied from the control section 10) to be given to the multiplier 25 (refer to FIG. 2) in the aperture control circuit 8 in response to a variation of the iris diaphragm diameter on the basis of a measurement result obtained as shown in the aforesaid FIG. 6A.

Figure 6B:
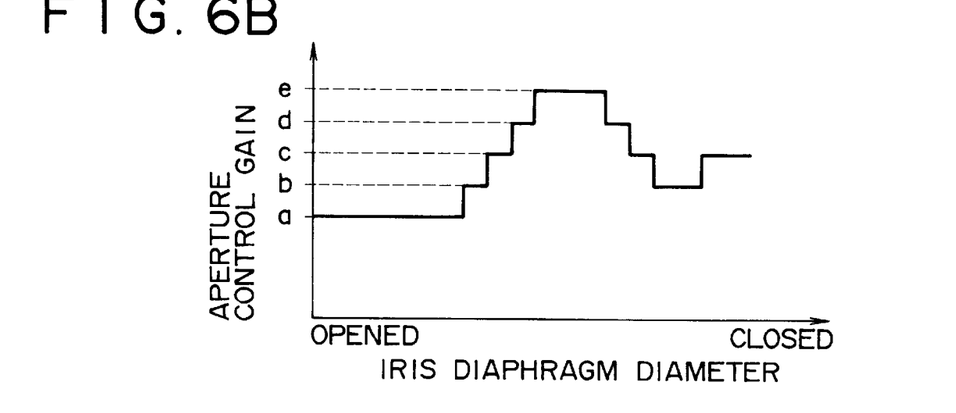

FIG. 6B indicates an example of setting of gain to be applied to the multiplier 25 in the aperture control circuit 8 in respect to a variation of iris diaphragm diameter on the basis of a result of measurement shown in FIG. 6A.

In this case, gains of five steps ranging from a lower gain to a higher gain, i.e. the gain (a) to the gain (e) are set. Then, a gain is variably set in respect to a variation of the iris diaphragm diameter in such a way that a pattern of curve line indicated in FIG. 6A as a result of measurement may become such a pattern as one in which a variation in this curve line is canceled.

Figure 6C:
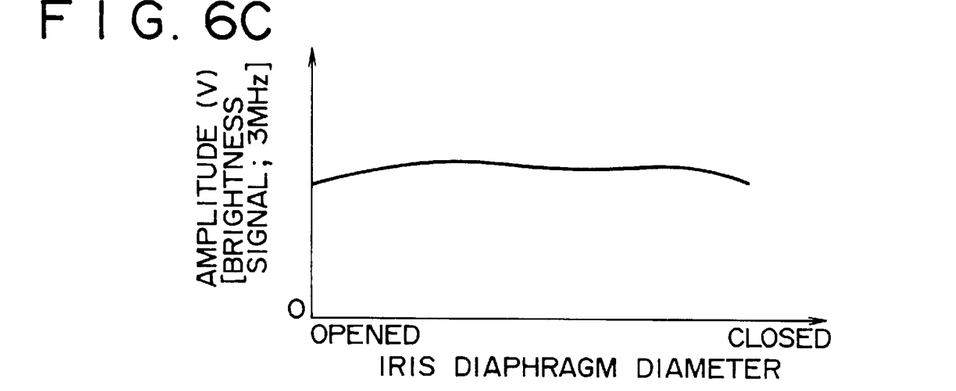

Then, the gain made variable as shown in FIG. 6B in response to a variation of the iris diaphragm diameter is given to the multiplier 25 in the aperture control circuit 8 to cause a high frequency component of the brightness signal of the image signal to which an aperture control is applied to keep a substantial constant amplitude level without having any relation with the iris diaphragm diameter as shown in FIG. 6C. As a result, a resolution of the entire image is improved after an approximate constant resolution feeling can be attained as an actual displayed subject image irrespective of a variation of the iris diaphragm diameter. Further, FIG. 6C indicates an amplitude of the brightness signal component of 3 MHz.

In order to realize such an aperture control operation, a data table for setting gains corresponding to iris diaphragm diameters indicated in FIG. 6B is stored in a data table memory 10a indicated in FIG. 1, for example.

Then, the control section 10 discriminates the present iris diaphragm diameter in response to an iris diaphragm diameter information of the iris diaphragm 3 supplied from the hole element 12 during photographing operation and determines a gain set in correspondence with this discriminated iris diaphragm diameter in reference to the data table stored in the data table memory 10a. Then, the gain determined in this way is given to the multiplier 25 in the aperture control circuit 8 as a control signal. It becomes possible to perform an aperture control in compliance with a variation of the iris diaphragm diameter described up to now through such a processing operation as one performed at the control section.

As the control signal supplied from the control section 10 to the multiplier 25 in the aperture control circuit 8, a voltage value corresponding to the set gain may be applied or a serial data of a predetermined number of bits, for example, may be applied.

Although the foregoing description relates to a correction of resolution generated by the variation of MTF in a horizontal direction, actually a correction of resolution in a vertical direction may also be similarly performed.

In order to perform this correction, it is possible to perform a measurement of a variation of MTF in respect to the iris diaphragm diameter in a vertical direction under application of a chart of subject with a high space frequency in a vertical direction by some lateral (horizontal direction) stripes, for example. Then, subsequently, a gain is set in such a manner that a variation of amplitude of the high frequency component of the brightness signal corresponding to a variation of MTF may be canceled on the basis of result of the measurement and the data is stored in the data table memory 10a in the same manner as that described up to now. It is sufficient that the control section 10 is constituted such that a gain of the multiplier 25 in the aperture control circuit 8 set to perform an aperture control in a vertical direction is made variable on the basis of this stored gain set data.

6. Correction of Resolution of the Preferred Embodiment and Correction Corresponding to a Variation of Zoom Position In the photographing device having an optical system, it has been made apparent that MTF may be varied not only in reference to an iris diaphragm diameter described up to now but also in reference to a zoom position of the zoom lens. Due to this fact, a variation of resolution caused by a variation in such a zoom position as described above is corrected in the preferred embodiment.

A relation between the variation of the zoom position and MTF relates to an aberration of a lens, so that it is possible to calculate it through simulation during designing of a lens or calculate it through measurement as found in the case of iris diaphragm. Then, as a value of MTF in respect to a variation of the zoom position in the video camera in the preferred embodiment of the present invention, the result shown in FIG. 7A has been attained. According to this figure, as the zoom position is moved from a wide position state to a tele-position state, it has become apparent that a characteristic having the value of MTF decreased has been attained, although a resolution may also be reduced as it is changed from the wide position state to the tele-position state.

Figure 7A:
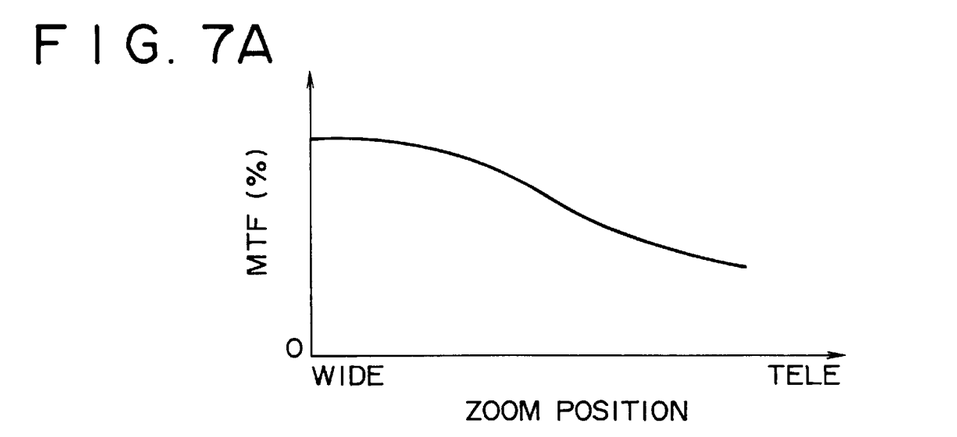
FIG. 7 is an illustrative view for showing an aperture control method in response to a zoom position in the preferred embodiment.
Figure 7B:
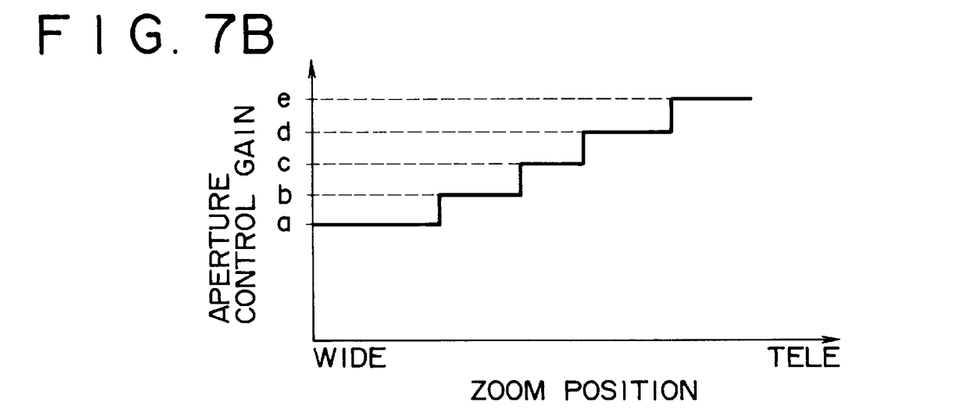

Thus, as shown in FIG. 7B, a gain to be given to the multiplier 25 in the aperture control circuit 8 is set to be variable in respect to a variation in zoom position. In this case, the gain is set to be increased in a stepwise manner by the gains (a) to (e) in response to a motion of the zoom position from the wide position state to the tele position state to cancel the characteristic shown in the aforesaid FIG. 7A.

Figure 7C:
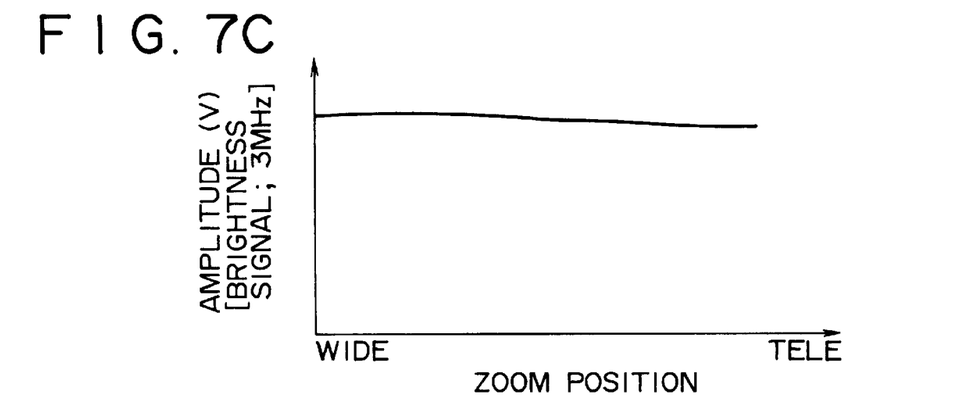

Then, the data table for use in setting a gain in respect to the zoom position indicated in the aforesaid FIG. 7B is stored in the data table memory 10a in the same manner as that of the iris diaphragm. Thus, the control section 10 may determine a gain corresponding to the present zoom position in reference to the data table stored in the data table memory 10a on the basis of the zoom position information supplied from the potentiometer 11 during photographing operation and supply this gain to the aperture control 8. Such an aperture control as described above is carried out to cause a high frequency component (in this case, it is set to 3 MHz) of the brightness signal to be controlled to have an approximate constant amplitude irrespective of a variation in zoom position as shown in FIG. 7C. With such an arrangement as above, "irregular state" of resolution feeling generated by variation in zoom position is also eliminated.

In addition, a characteristic shown in the aforesaid FIG. 7A indicates a characteristic of MTF of the image in a horizontal direction, wherein the aperture control based on the data table for setting a gain indicated in FIG. 7B corresponds to a horizontal direction of the image. Thus, a correction of the resolution in respect to a variation of the zoom position is similarly carried out not only in a horizontal direction but also in a vertical direction of the aforesaid image.

In the preferred embodiment of the present invention, an aperture control is carried out in such a manner that a constant resolution feeling may be attained irrespective of a variation in state of the optical system such as an iris diaphragm diameter or a zoom position. In addition, since the preferred embodiment is usually set such that a gain of the aperture control circuit is variably set in such a manner that it may be accommodated for a variation of MTF, resulting in that its cost, in particular, is not increased.

Further, the present invention is not limited to a constitution of the preferred embodiment which has been described up to now, wherein various modifications can be attained and the present invention can be applied to various kinds of photographing devices having an optical system such as a digital still camera other than a video camera and a signal processing device for use in processing an image signal supplied from such a photographing device as described above. In addition, although a constitution for processing a brightness signal component is indicated as an aperture control for intensifying the high range component of the image signal in the aforesaid preferred embodiment, it is also possible that the aberration signal component is also occasionally processed with an aperture control.

What is claimed is:

1. An image signal processing method for processing an image signal of a photographed image provided by a photographing device having an optical system including a zoom lens and an iris diaphragm with a light attenuating filter, said method comprising:

isolating a high frequency band of a brightness signal component of said image signal by delaying said brightness signal component to obtain a first delayed signal, delaying said first delayed signal to obtain a second delayed signal, amplifying said first delayed signal relative to said brightness signal component and said second delayed signal, and subtracting said brightness signal component and said second delayed signal from said amplified first signal to obtain an isolated high frequency band of said brightness signal component;

determining a zoom position of said zoom lens and an aperture size of said iris diaphragm, wherein variation of said zoom position and aperture size causes variation of resolution of said image signal, and said variation of resolution caused by the aperture size variation has a local minimum within a range of the aperture size variation;

selecting a gain, corresponding to the determined zoom position and aperture size, from a plurality of gain values stored in a data table memory; and intensifying said high frequency band at the selected gain, wherein degradation of resolution of said image signal due to said zoom lens and said iris diaphragm with light attenuating filter is corrected, and resolution becomes approximately constant with zoom position and iris diaphragm aperture size variation.

2. An image signal processing method as set forth in claim 1, wherein a variation of state in said optical system is generated in response to an aberration of a lens.

3. An image signal processing device for processing an image signal of a photographed image, said image signal generated by a photographing device having an optical system including a zoom lens and an iris diaphragm with a light attenuating filter, said image signal processing device comprising:

a high pass filter circuit for isolating a high frequency band of a brightness signal component of said image signal, said high pass filter circuit comprising a first delay for delaying said brightness signal component to obtain a first delayed signal, a second delay for delaying said first delayed signal to obtain a second delayed signal, means for amplifying said first delayed signal with respect to each of said brightness signal component and said second delayed signal, and a synthesizer to subtract said brightness signal component and said second delayed signal from said first delayed signal to obtain said isolated high frequency band of said brightness signal component;

a data table memory for storing a plurality of gain values each corresponding to a zoom position of said zoom lens and an aperture size of said iris diaphragm, wherein variation of said zoom position and aperture size causes variation of resolution of said image signal, and said variation of resolution caused by the aperture size variation has a local minimum within a range of the aperture size variation;

a control section adapted to determine a zoom position of said zoom lens and an aperture size of said iris diaphragm, to select a gain value from said plurality of gain values according to the determined zoom position and aperture size; and a variable gain amplifier for intensifying said high frequency band at the selected gain, wherein degradation of resolution of said image signal due to said zoom lens and said iris diaphragm with light attenuating filter is corrected, and resolution becomes approximately constant with zoom position and iris diaphragm aperture size variation.

4. An image signal processing device as set forth in claim 3, wherein said image signal processing device is constructed such that a variation of resolution of said image signal generated in response to an aberration of a lens is corrected.

5. An image signal processing device as set forth in claim 3, wherein each of said first and second delays is adapted to delay the signal input thereto in synchronism with a clock frequency corresponding to the number of pixels in one horizontal line.

6. An image signal processing device as set forth in claim 3, wherein each of said first and second delays is adapted to delay the signal input thereto in synchronism with a clock frequency corresponding to one horizontal line.

7. An image signal processing device as set forth in claim 3, wherein said iris diaphragm is a two-vane mechanism.

8. An image signal processing device comprising an image signal recording device for recording an image signal of a photographed image, said image signal generated by a photographing device having an optical system including a zoom lens and an iris diaphragm with a light attenuating filter, said image signal processing device comprising:

a high pass filter circuit for isolating a high frequency band of a brightness signal component of said image signal, said high pass filter circuit comprising a first delay for delaying said brightness signal component to obtain a first delayed signal, a second delay for delaying said first delayed signal to obtain a second delayed signal, means for amplifying said first delayed signal with respect to each of said brightness signal component and said second delayed signal, and a synthesizer to subtract said brightness signal component and said second delayed signal from said first delayed signal to obtain said isolated high frequency band of said brightness signal component;

a data table memory for storing a plurality of gain values each corresponding to a position of said zoom lens and an aperture size of said iris diaphragm, wherein variation of said zoom position and aperture size causes variation of resolution of said image signal, and said variation of resolution caused by the aperture size variation has a local minimum within a range of the aperture size variation;

a control section adapted to determine a zoom position of said zoom lens and an aperture size of said iris diaphragm, to select a gain value from said plurality of gain values according to the determined position and aperture size; and a variable gain amplifier for intensifying said high frequency band at the selected gain, wherein degradation of resolution of said image signal due to said zoom lens and said iris diaphragm with light attenuating filter is corrected, and resolution becomes approximately constant with zoom position and iris diaphragm aperture size variation.

9. An image signal processing method for processing an image signal of a photographed image provided by a photographing device having an optical system including an iris diaphragm with a light attenuating filter, said method comprising:

isolating a high frequency band of a brightness signal component of said image signal by delaying said brightness signal component to obtain a first delayed signal, delaying said first delayed signal to obtain a second delayed signal, amplifying said first delayed signal relative to said brightness signal component and said second delayed signal, and subtracting said brightness signal component and said second delayed signal from said amplified first signal to obtain an isolated high frequency band of said brightness signal component;

determining an aperture size of said iris diaphragm, wherein variation of said aperture size causes variation of resolution of said image signal, and said variation of resolution caused by the aperture size variation has a local minimum within a range of the aperture size variation;

selecting a gain, according to the determined aperture size, from a plurality of gain values stored in a data table memory, each gain value corresponding to an aperture size of said iris diaphragm; and intensifying said high frequency band at the selected gain, wherein degradation of resolution of said image signal due to said aperture size of said iris diaphragm with light attenuating filter is corrected, and resolution becomes approximately constant with aperture size variation.

10. An image signal processing device for processing an image signal of a photographed image, said image signal generated by a photographing device having an optical system including an iris diaphragm with a light attenuating filter, said device comprising:

a high pass filter circuit for isolating a high frequency band of a brightness signal component of said image signal, said high pass filter circuit comprising a first delay for delaying said brightness signal component to obtain a first delayed signal, a second delay for delaying said first delayed signal to obtain a second delayed signal, means for amplifying said first delayed signal with respect to each of said brightness signal component and said second delayed signal, and a synthesizer to subtract said brightness signal component and said second delayed signal from said first delayed signal to obtain an isolated high frequency band of said brightness signal component;

a data table memory for storing a plurality of gain values each corresponding to an aperture size of said iris diaphragm, wherein variation of said aperture size causes variation of resolution of said image signal, and said variation of resolution caused by the aperture size variation has a local minimum within a range of the aperture size variation;

a control section adapted to determine an aperture size of said iris diaphragm and to select a gain value from said plurality of gain values according to the determined size; and a variable gain amplifier for intensifying said high frequency band at the selected gain, wherein degradation of resolution of said image signal due to aperture size of the iris diaphragm with light attenuating filter is corrected, and resolution becomes approximately constant with aperture size variation.

11. An image signal processing device comprising an image signal recording device for recording an image signal of a photographed image, said image signal generated by a photographing device having an optical system including an iris diaphragm with a light attenuating filter, said device comprising:

a high pass filter circuit for isolating a high frequency band of a brightness signal component of said image signal, said high pass filter circuit comprising a first delay for delaying said brightness signal component to obtain a first delayed signal, a second delay for delaying said first delayed signal to obtain a second delayed signal, means for amplifying said first delayed signal with respect to each of said brightness signal component and said second delayed signal, and a synthesizer to subtract said brightness signal component and said second delayed signal from said first delayed signal to obtain an isolated high frequency band of said brightness signal component;

a data table memory for storing a plurality of gain values each corresponding to an aperture size of said iris diaphragm, wherein variation of said aperture size causes variation of resolution of said image signal, and said variation of resolution has a local minimum within a range of the aperture size variation;

a control section adapted to determine an aperture size of said iris diaphragm and to select a gain value from said plurality of gain values according to the determined aperture size; and a variable gain amplifier for intensifying said high frequency band at the selected gain, wherein degradation of resolution of said image signal due to aperture size of the iris diaphragm with light attenuating filter is corrected, and resolution becomes approximately constant with aperture size variation.

12. An image signal processing method for processing an image signal of a photographed image provided by a photographing device having an optical system including a zoom lens and an iris diaphragm with a light attenuating filter, said method comprising:

isolating a high frequency band of a brightness signal component of said image signal;

determining a state of said optical system which is a function of at least a zoom position of said zoom lens and an aperture size of said iris diaphragm, wherein variation of said zoom position and said aperture size causes variation of resolution of said image signal, and said variation of resolution caused by the aperture size variation has a local minimum within a range of the aperture size variation; and intensifying said high frequency band at a gain which is a function of said optical system state in a manner such that degradation of resolution of said image signal due to said zoom lens and said aperture size of the iris diaphragm with light attenuating filter is corrected, and resolution becomes approximately constant with zoom position and iris diaphragm aperture size variation.

13. An image signal processing device for processing an image signal for a photographed image, said image signal generated by a photographing device having an optical system including at least an iris diaphragm with a light attenuating filter, said image signal processing device comprising:

a memory section storing a plurality of gain values corresponding to an aperture size of said iris diaphragm with light attenuating filter;

a control section determining an aperture size of said iris diaphragm with light attenuating filter, and selecting a gain value in accordance with said determined aperture size; and a compensation section compensating said image signal using said gain value selected by said control section;

wherein a resolution of said image signal varies in accordance with an aperture size of said iris diaphragm with light attenuating filter, said variation of image signal resolution caused by said aperture size variation exhibits a local minimum within a range of said aperture size variation, and said gain values compensate for said local minimum.

14. The image signal processing device according to claim 13, wherein said compensation section comprises:

a high pass filter circuit isolating a high frequency band of said image signal;

a variable gain amplifier intensifying said high frequency band by said gain value selected at said control section; and an adder unit adding said intensified high frequency band of said image signal to said image signal.

15. A camera comprising an image signal processing device for processing an image signal for a photographed image, said image signal generated by a photographing device having an optical system including at least an iris diaphragm with a light attenuating filter, said image signal processing device comprising:

a memory section storing a plurality of gain values corresponding to an aperture size of said iris diaphragm with light attenuating filter;

a control section determining an aperture size of said iris diaphragm with light attenuating filter, and selecting a gain value in accordance with said determined aperture size; and a compensation section compensating said image signal using said gain value selected by said control section;

wherein a resolution of said image signal varies in accordance with an aperture size of said iris diaphragm with light attenuating filter, said variation of image signal resolution caused by said aperture size variation exhibits a local minimum within a range of said aperture size variation, and said gain values compensate for said local minimum.

16. The camera according to claim 15, wherein said compensation section comprises:

a high pass filter circuit isolating a high frequency band of said image signal;

a variable gain amplifier intensifying said high frequency band by said gain value selected at said control section; and an adder unit adding said intensified high frequency band of said image signal to said image signal.

17. An image signal processing method for processing an image signal for a photographed image, said image signal generated by a photographing device having an optical system including at least an iris diaphragm with a light attenuating filter, said method comprising:

storing a plurality of gain values corresponding to an aperture size of said iris diaphragm with light attenuating filter;

determining an aperture size of said iris diaphragm with light attenuating filter, and selecting a gain value in accordance with said determined aperture size; and compensating said image signal using said gain value selected;

wherein a resolution of said image signal varies in accordance with an aperture size of said iris diaphragm with light attenuating filter, said variation of image signal resolution caused by said aperture size variation exhibits a local minimum within a range of said aperture size variation, and said gain values compensate for said local minimum.

18. The image signal processing method according to claim 17, wherein said compensating includes:

isolating a high frequency band of said image signal;

intensifying said high frequency band by said gain value selected; and adding said intensified high frequency band of said image signal to said image signal.

19. Apparatus comprising:

an image signal processing device for processing an image signal for a photographed image, said image signal generated by a photographing device having an optical system including at least an iris diaphragm with a light attenuating filter, said image signal processing device comprising:

a memory section storing a plurality of gain values corresponding to an aperture size of said iris diaphragm with light attenuating filter;

a control section determining an aperture size of said iris diaphragm with light attenuating filter, and selecting a gain value in accordance with said determined aperture size; and a compensation section compensating said image signal using said gain value selected by said control section;

wherein a resolution of said image signal varies in accordance with an aperture size of said iris diaphragm with light attenuating filter, said variation of image signal resolution caused by said aperture size variation exhibits a local minimum within a range of said aperture size variation, and said gain values compensate for said local minimum.

20. Apparatus according to claim 19, wherein said compensation section comprises:

a high pass filter circuit isolating a high frequency band of said image signal;

a variable gain amplifier intensifying said high frequency band by said gain value selected at said control section; and an adder unit adding said intensified high frequency band of said image signal to said image signal.

* * * * *